US008452885B2

(12) United States Patent
Sherer et al.

(10) Patent No.: US 8,452,885 B2
(45) Date of Patent: May 28, 2013

(54) PLAYOUT-DEPENDENT UNICAST STREAMING OF DIGITAL VIDEO CONTENT

(75) Inventors: W. Paul Sherer, Danville, CA (US); Kirk Blattman, San Ramon, CA (US); Danny M. Nessett, Fremont, CA (US); David Yates, Menlo Park, CA (US)

(73) Assignee: Cisco Technology, Inc., San Jose, CA (US)

( * ) Notice: Subject to any disclaimer, the term of this patent is extended or adjusted under 35 U.S.C. 154(b) by 912 days.

(21) Appl. No.: 11/360,370

(22) Filed: Feb. 23, 2006

(65) Prior Publication Data

US 2006/0200575 A1 Sep. 7, 2006

Related U.S. Application Data

(60) Provisional application No. 60/655,328, filed on Feb. 23, 2005.

(51) Int. Cl.
*G06F 15/16* (2006.01)
*H04N 7/173* (2011.01)

(52) U.S. Cl.
USPC ............ 709/231; 709/227; 709/230; 725/87; 725/88; 725/91; 725/93; 725/102

(58) Field of Classification Search
USPC ............ 709/201, 217, 227, 231, 230; 725/1, 725/88, 46, 86, 87, 91, 93, 94, 95, 101–103; 370/432, 487; 715/840
See application file for complete search history.

(56) References Cited

U.S. PATENT DOCUMENTS

| | | | |
|---|---|---|---|
| 6,085,252 A | 7/2000 | Zhu et al. | |
| 6,263,371 B1* | 7/2001 | Geagan et al. | 709/231 |
| 6,377,972 B1* | 4/2002 | Guo et al. | 709/201 |
| 6,385,647 B1* | 5/2002 | Willis et al. | 709/217 |
| 6,418,473 B1* | 7/2002 | St. Maurice et al. | 709/231 |
| 6,651,089 B1* | 11/2003 | Stead | 709/217 |
| 6,769,127 B1* | 7/2004 | Bonomi et al. | 725/39 |
| 6,782,550 B1* | 8/2004 | Cao | 725/39 |
| 6,973,667 B2* | 12/2005 | Fritsch | 725/88 |
| 7,080,153 B2* | 7/2006 | Monteiro et al. | 709/231 |
| 7,082,142 B1* | 7/2006 | Begeja | 370/507 |
| 7,296,091 B1* | 11/2007 | Dutta et al. | 709/245 |
| 7,477,653 B2* | 1/2009 | Smith et al. | 370/432 |

(Continued)

OTHER PUBLICATIONS

Schulzrinne, H., et al., "RFC: 2326 Real Time Streaming Protocol," Network Working Group, Request for Comments: 2326, Apr. 1998, XP-002519853.

*Primary Examiner* — Tae Kim
(74) *Attorney, Agent, or Firm* — Merchant & Gould

(57) ABSTRACT

A technique for managing the streaming of digital video content involves providing a unicast stream to a client in response to the playout status of the unicast stream at the client. In particular, a unicast stream is provided to a client based on whether or not the unicast stream is intended for real-time playout at the client. In order to preserve valuable network resources, if the client does not intend the unicast stream for real-time playout, the unicast stream is not provided to the client. Network resources can also be conserved by utilizing one session between a stream server and a client to support more than one active unicast stream between the stream server and the client in the case where at least one of the active unicast streams is not intended for real-time playout at the client.

10 Claims, 9 Drawing Sheets

U.S. PATENT DOCUMENTS

| | | | |
|---|---|---|---|
| 2002/0010917 A1* | 1/2002 | Srikantan et al. | 725/1 |
| 2002/0022970 A1* | 2/2002 | Noll et al. | 705/1 |
| 2002/0056126 A1* | 5/2002 | Srikantan et al. | 725/87 |
| 2002/0124098 A1* | 9/2002 | Shaw | 709/231 |
| 2002/0124258 A1* | 9/2002 | Fritsch | 725/88 |
| 2002/0124262 A1* | 9/2002 | Basso et al. | 725/109 |
| 2002/0143951 A1* | 10/2002 | Khan et al. | 709/227 |
| 2002/0152278 A1* | 10/2002 | Pontenzone et al. | 709/217 |
| 2002/0194595 A1* | 12/2002 | Miller et al. | 725/36 |
| 2003/0229900 A1* | 12/2003 | Reisman | 725/87 |
| 2005/0005306 A1* | 1/2005 | Kim et al. | 725/131 |
| 2005/0015812 A1* | 1/2005 | Banet et al. | 725/126 |
| 2005/0028219 A1 | 2/2005 | Atzmon et al. | |
| 2005/0100016 A1* | 5/2005 | Miller et al. | 370/390 |
| 2005/0114794 A1* | 5/2005 | Grimes et al. | 715/840 |
| 2005/0183120 A1* | 8/2005 | Jain et al. | 725/46 |
| 2006/0018335 A1* | 1/2006 | Koch et al. | 370/432 |
| 2006/0039367 A1* | 2/2006 | Wright et al. | 370/382 |
| 2006/0083263 A1* | 4/2006 | Jagadeesan et al. | 370/487 |
| 2006/0184973 A1* | 8/2006 | de Heer et al. | 725/80 |
| 2007/0083899 A1* | 4/2007 | Compton et al. | 725/87 |

* cited by examiner

PLAYOUT-DEPENDENT UNICAST STREAMING OF DIGITAL VIDEO CONTENT

CROSS-REFERENCE TO RELATED APPLICATION

This application is entitled to the benefit of provisional U.S. Patent Application Ser. No. 60/655,328, filed Feb. 23, 2005, the disclosure of which is incorporated by reference herein in its entirety.

FIELD OF THE INVENTION

The invention relates generally to digital video networks, and more particularly, to techniques for managing unicast streaming in digital video networks that are capable of distributing digital video content via multicasting and unicasting.

BACKGROUND OF THE INVENTION

Providers of television-based entertainment are attempting to expand the range of services that they offer to subscribers in order to increase revenues. In addition to television content such as that found on conventional cable networks, some providers also offer interactive video services, such as video on demand. The provision of interactive video services is stimulating the further development of digital network technology, which in turn will enable providers to increase the number and kinds of video services offered to subscribers.

Video on demand allows users to select and watch video content over a network as part of an interactive television experience. Video on demand systems may support "streaming," in which digital video content is available to the subscriber while the video streams over the network, and/or "downloading," in which digital video content is downloaded to a subscriber device, such as a set-top box, before the content is available to the subscriber.

Some digital video networks that provide video on demand services stream digital video content to clients via multicasting and unicasting, where multicasting is used to distribute the same content to multiple clients concurrently and unicasting is used to provide specific content to a particular client. The clients receive streams of digital video content via multicasting or unicasting and playout the digital video content to a device such as a television. Although a particular client may only playout one stream at a time, there are instances in which it is desirable to have more than one unicast stream active at the same time between a stream server and the client. In conventional digital video networks, the establishment of multiple unicast streams between a stream server and a client triggers the setup of multiple unicast sessions between the stream server and the client to reserve the bandwidth resources that are needed to support each different unicast stream. However, if the client is only playing out one unicast stream at a time, valuable network resources can be wasted using this technique.

SUMMARY OF THE INVENTION

A technique for managing the streaming of digital media content involves providing a unicast stream to a client in response to the playout status of the unicast stream at the client. In particular, a unicast stream is provided to a client based on whether or not the unicast stream is intended for real-time playout at the client. In order to preserve valuable network resources, if the client does not intend the unicast stream for real-time playout, the unicast stream is not provided to the client. This technique can be used to allow a client to have more than one active unicast stream even though only one of the unicast streams is actually being played out at the client.

In accordance with another embodiment of the invention, network resources are conserved by utilizing one session between a stream server and a client to support more than one active unicast stream between the stream server and the client in the case where at least one of the active unicast streams is not intended for real-time playout at the client. In an example in which the client is only playing out one unicast stream at a time, only one session is established between the stream server and the client. The one session is used to support which ever unicast stream is intended for real-time playout at the client.

Utilization of playout-dependent unicast streaming can improve network efficiency by preventing the needless consumption of resources (e.g., stream server, network, and client resources) associated with an active unicast stream that is not intended for real-time playout at a client. The utilization of playout-dependent streaming also enables a resource limited client (e.g., client with only one RF tuner) to manage more than one unicast stream at a time.

Other aspects and advantages of the present invention will become apparent from the following detailed description, taken in conjunction with the accompanying drawings, illustrating by way of example the principles of the invention.

BRIEF DESCRIPTION OF THE DRAWINGS

Throughout the description, similar reference numbers may be used to identify similar elements.

DETAILED DESCRIPTION OF THE INVENTION

As used herein, the terms "multicast" and "multicasting" refer to a technique for providing the same digital video content to multiple clients concurrently in which the digital video content is delivered over common links only once (e.g., the digital video content is copied when it reaches nodes with links to multiple destinations). As used herein, multicast and multicasting are synonymous with the terms broadcast and broadcasting as related to, for example, hybrid fiber coaxial (HFC) cable networks.

As used herein, the terms "unicast" and "unicasting" refer to a technique for providing digital video content to a single specified client.

In some applications, the network for distributing digital video content is a packet-based network. In packet-based networks, multicasting may involve replicating packets at nodes that include multiple branches leading to different clients. The replication of packets at branching nodes eliminates the need to send multiple packets of the same content over the same link. Packet-based distribution networks may utilize, for example, Internet Protocol (IP), Ethernet, asynchronous transfer mode (ATM), or a combination thereof to communicate digital video content. In packet-based networks, unicasting typically involves point-to-point messaging between nodes (e.g., servers and clients). Point-to-point messaging can be accomplished, for example, using well-known source/destination address based protocols (e.g., IP or Ethernet).

In some applications, the network for distributing digital video content includes an HFC network that utilizes radio frequency signals (RF) for local distribution of digital video content to the clients. In HFC networks, multicasting typically involves distributing all channels to all clients. Each client is able to receive any channel by tuning to the desired channel. In HFC networks, unicasting may involve distributing a channel, which is intended for only one client, to multiple clients and coordinating with the intended client so that only the intended client receives the desired channel. Even though the channel may be distributed to multiple clients, only one client, the intended client, is able to access the channel and display the digital video content. For purposes of this description, a communications technique such as this, which can be implemented in HFC networks, is considered unicasting.

Figure 1:
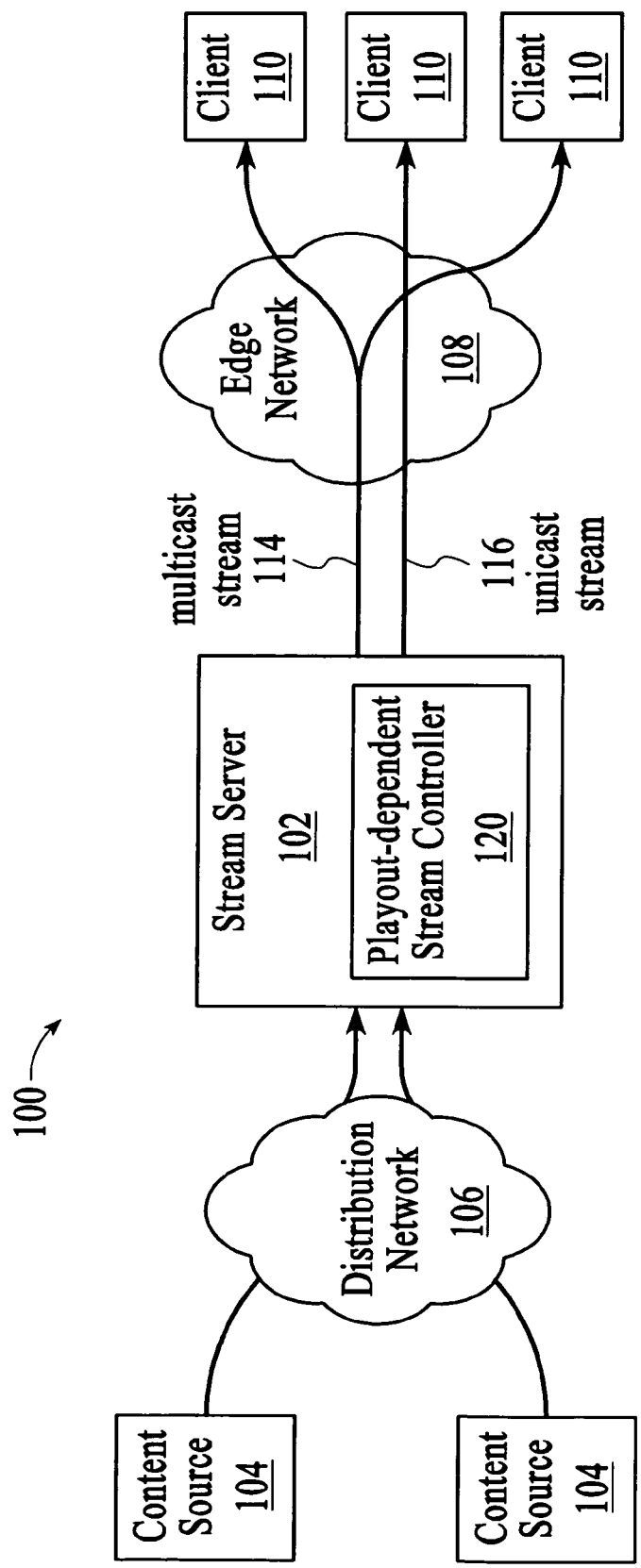
FIG. 1 depicts a network that includes a stream server configured to manage the streaming of digital video content in accordance with an embodiment of the invention.

FIG. 1 depicts a network 100 that includes a stream server 102 that is configured to manage the streaming of digital video content in accordance with an embodiment of the invention. The network depicted in FIG. 1 is capable of streaming digital video content to clients via multicasting and unicasting and includes at least one content source 104, a distribution network 106, the stream server, an edge network 108, and multiple clients 110. The content sources provide digital video content to the stream server via the distribution network. In an embodiment, the digital video content is real-time digital video content that is received at a content source and passed to the stream server with little or no delay. For example, the digital video content includes real-time content from the content producers and/or distributors. The digital video content may include, for example, live content (e.g., live sporting events, news, etc.) or pre-recorded content that is released by the content producers and/or distributors. In another embodiment, the digital video content may include content that is played over and over in a repeating loop. In still another embodiment, the digital video content may be stored by the content source, the stream server, a dedicated storage server, or within the distribution or edge networks. Whether the digital video content is real-time or stored, the digital video content is available to the stream server for distribution to the clients.

The distribution network 106 can be any type of network that is able to connect the content sources 104 to the stream server 102. Exemplary network technologies that may be utilized in the distribution network include, but are not limited to, IP, Ethernet, ATM, synchronous optical network (SONET), wavelength division multiplexed (WDM), wide area network (WAN), and local area network (LAN).

The stream server 102 provides digital video content simultaneously to multiple clients 110 via multicasting (e.g., multicast stream 114) and provides digital video content to a particular single client via unicasting (e.g., unicast stream 116). The stream server includes a playout-dependent stream controller 120, the function of which is described in more detail below. Although the stream server is depicted as a single entity for description purposes, the stream server may be implemented as a single server or multiple servers that act collectively to stream digital video content to the clients.

The edge network 108 includes any type of edge network. Exemplary edge networks include telecommunications networks, such as those which have traditionally been used to provide residential telephone service and are now used to provide video, voice, and data communications and cable networks, such as those which have traditionally been used to deliver residential cable television and are now used to provide video, voice, and data communications. The edge network supports the multicasting and unicasting of digital video content downstream to the clients 110. The edge network also supports upstream messaging from the clients to the stream server 102. The edge network may utilize any network technology that supports multicasting and unicasting. In a packet-based environment, the edge network may utilize, for example, routers, switches, DSLAMs, passive optical network (PON) architectures, or any combination thereof. In an HFC environment, the edge network may utilize, for example, a combination of routers, switches, and QAMs.

The clients 110 are systems that receive the digital video content from the edge network 108 and playout the digital video content to devices such as video display devices (e.g., televisions). The clients may be embodied as hardware, firmware, software, or any combination thereof and are sometimes referred to as set-top boxes (STBs). Clients that are able to receive and playout digital video content may also be incorporated into devices such as televisions and computers. Clients in general are well-known in the field. Specific functions of the clients in accordance with the invention are described in more detail below.

The clients 110 are able to playout a limited number of streams of digital video content at the same time. For example, in a simple case, a client is able to playout only one stream of digital video content at a time. In this case, the client may playout the digital video content to a single display device, such as a television. In other cases, the client may be able to playout more than one stream of digital video content at a time. As used herein, the terms "playout" and "playing out" refer to the delivery of a stream of digital video content from the client to another device such as a television or other video display device. In one embodiment, the played out digital video content is decoded and in another embodiment, the played out digital video content is not decoded (e.g., it is still in MPEG format). Although playout to a display device is one form of playout, a stream of digital video content can alternatively be played out from the client to a memory device, such as, for example, a hard disk drive, an optical storage media (e.g., an compact disc), or flash memory. In an embodiment, the number of streams that can be concurrently played out by a client corresponds to the number of playout engines included within the client. A playout engine is any combination of hardware, firmware, and software that enables a stream of digital video content to be decoded and provided to another device. In an HFC environment, the number of playout engines corresponds to the number of tuners associated with a client. In an IP environment, the number of playout engines corresponds, in part, to processing, memory, and interface limitations at the client.

As used herein, "real-time playout" means that the digital video content is played out from the client 110 instantly or nearly instantly after it is received at the client. For example, a client may buffer a few frames of an incoming stream, but the frames are played out after only a short buffer period. An exemplary playout delay may be on the order of tens of milliseconds, although other schemes may have a delay on the order of, for example, hundreds or thousands of milliseconds.

Figure 2:
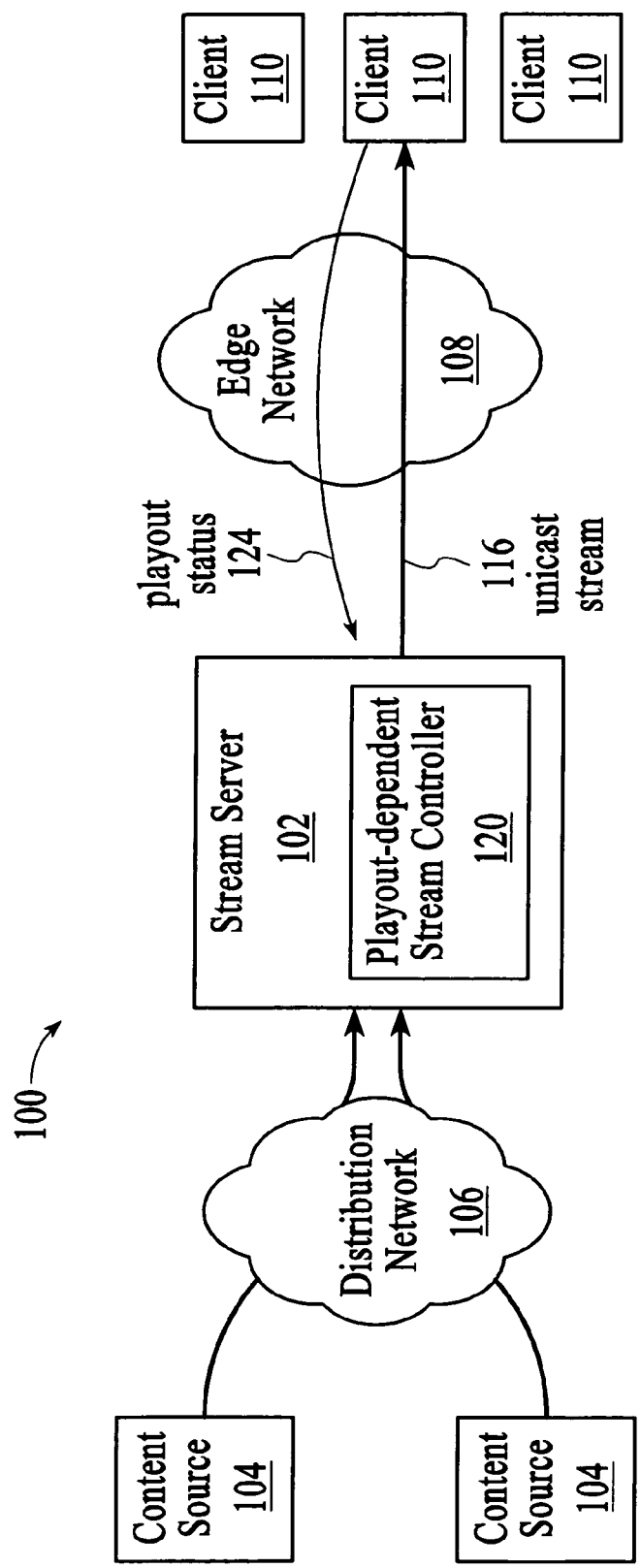
FIG. 2 illustrates the communication of playout status information from a client to a stream server.

The clients 110 communicate content selection information to the stream server 102 to indicate the content that the clients desire to receive. The content selection information may include, for example, channel selection information (e.g., the client wants to receive the indicated channel) and/or program selection information (e.g., the client wants to receive the indicated program). One component of the content selection information is playout status information. Playout status information indicates which content a particular client is currently playing out or intends to playout as soon as the desired content is provided. In an embodiment, playout status information is communicated to the stream server through a channel change notification protocol. For example, a channel change notification protocol is used between the client and the stream server to indicate the channel that the client desires to playout (e.g., provide to a display device) and to communicate channel change requests. FIG. 2 illustrates the communication of playout status information 124 from a client to the stream server. As is described in more detail below, communications via the channel change notification protocol also indicate when multiple unicast streams are desired to be simultaneously active between the steam server and a client.

In accordance with an embodiment of the invention, the playout dependent stream controller 120 of the stream server 102 is configured to provide a unicast stream to the client 110 in response to the playout status of the unicast stream at the client. In particular, the playout-dependent stream controller decides whether or not to provide a unicast stream to the client based on whether or not the unicast stream is intended for real-time playout at the client. In order to preserve valuable resources and in accordance with an embodiment of the invention, if the client does not intend the unicast stream for real-time playout, the unicast stream is not provided to the client.

Figure 3A:
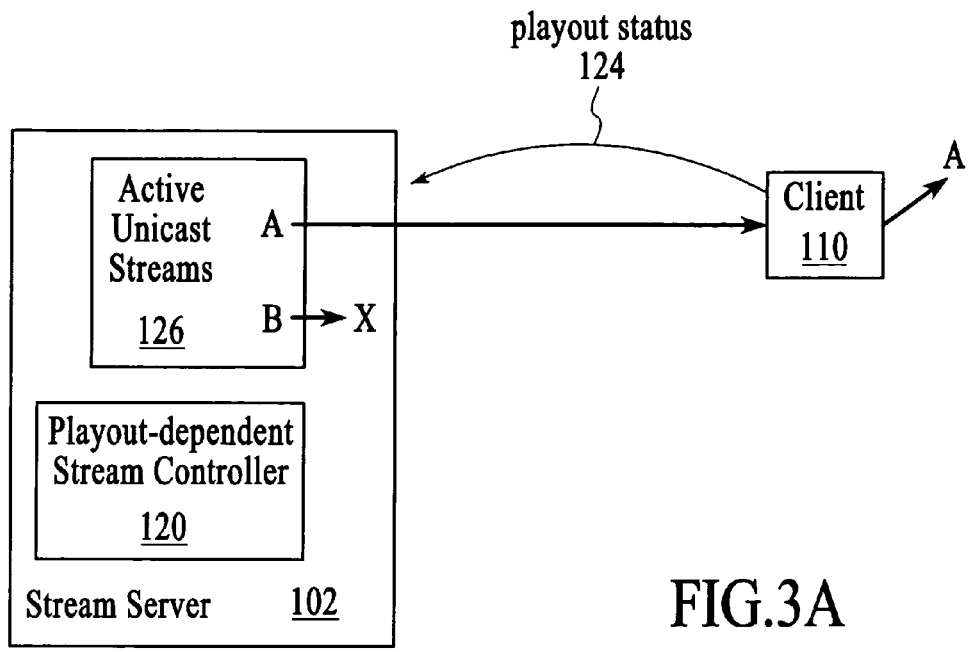
FIGS. 3A and 3B illustrate two unicast streams that are managed by a playout-dependent stream controller in response to playout status information.

Playout-dependent unicast streaming is particularly applicable to cases in which two unicast streams are active between a stream server and client yet the client only plays out one unicast stream at a time. FIG. 3A illustrates the case in which two unicast streams 126 (unicast streams A and B) are active between a stream server 102 and a client 110. The active unicast streams are established in response to content selection information received from the client. In an embodiment, a unicast stream is established (and considered active) when a client requests a channel change, utilizes a Network Personal Video Recorder (NPVR) function, or makes a request for digital video content that is not currently being provided to clients via multicasting. Unicast streams can also be triggered by events other than those identified herein.

The active unicast streams identified in FIG. 3A are used to provide digital video content to the client 110. While both unicast streams (unicast streams A and B) are active from the perspective of the client and the stream server 102, the client only plays out one unicast stream at a time. As illustrated in FIG. 3A, the playout status 124 is provided to the stream server and the playout status indicates that only unicast stream A is intended for real-time playout at the client. In response to the playout status, the playout-dependent stream controller 120 provides unicast stream A to the client and acts to prevent unicast stream B from being provided to the client. Although unicast stream B is active between the client and the stream server, it is not actually provided (e.g., streamed) to the client. By providing only unicast stream A to the client when unicast stream A is the only stream intended for real-time playout, valuable network resources can be conserved.

Figure 3B:
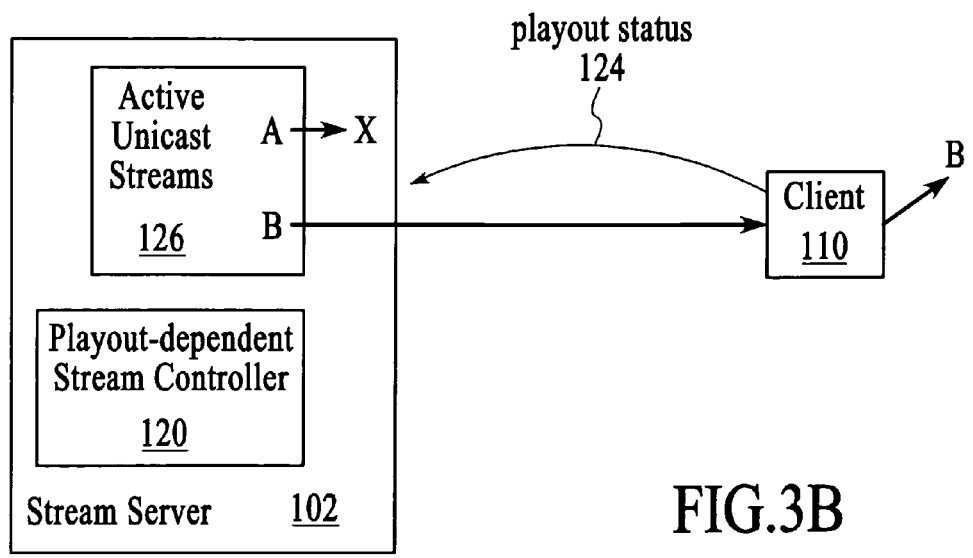

If the playout status changes to indicate that unicast stream B is intended for playout instead of unicast stream A, then the playout-dependent stream controller causes unicast stream B to be provided to the client instead of unicast stream A. FIG. 3B illustrates the state of unicast streams A and B after the client 110 switches to playing out unicast stream B. As indicated in FIG. 3B, unicast stream B is provided to the client while unicast stream A is held at the stream server 102. By allowing the stream server to concurrently maintain two unicast streams for the client, the client can rapidly switch back and forth between the two streams without having to establish a new stream each time. This operation makes the client appear, for example, as if it has two tuners when in fact it only has one tuner. In effect, this technique adds a "virtual tuner" capability to the video on demand network that heretofore has not been possible.

The concept of playout-dependent unicast streaming as described above is especially applicable when the resources needed for unicast streaming are managed using sessions. As is known in the field, a session can be established between a stream server and a client as a way of ensuring that sufficient network resources are available to provide a unicast stream to the client. For example, establishing a session between a steam server and a client involves reserving resources within the stream server and the edge network that are needed to provide a unicast stream to the client. In an embodiment, a "session" refers to a set of resources that are reserved to support a unicast stream. An exemplary session setup protocol is real time streaming protocol (RTSP). Additionally, many examples of sessions are known in the field. One could send datagrams via User Datagram Protocol (UDP) or one could use a reliable session protocol such as Transmission Control Protocol (TCP). Further, the video frames could be wrapped in MPEG, Real-Time Transport Protocol (RTP), or Hypertext Transfer Protocol (HTTP) headers. In all cases, when digital video content is transiting the network, network resources are being consumed.

The establishment of a session effectively ties up network resources whether or not those resources are used to provide a unicast stream to the client. That is, once network resources have been reserved through the session setup process, they are not available for other uses. In digital video implementations, the establishment of a unicast stream between a stream server and a client triggers the establishment of a session. Likewise, the establishment of two concurrent unicast streams between a stream server and a client typically triggers the establishment of two sessions between the stream server and the client. The two sessions each have their own set of reserved network resources. If two unicast streams (with the corresponding sessions) are active between a stream server and a client but only one unicast stream is intended for real-time playout at the client, the resources that are associated with the non-played out unicast stream (e.g., the reserved session resources) are not being efficiently utilized while the unicast stream is not being played out at the client.

In accordance with an embodiment of the invention, network resources are conserved by utilizing one session to support more than one active unicast stream in the case where at least one active unicast stream is not intended for real-time playout at the client. In an example in which there is more than one active unicast stream yet the client only plays out one unicast stream at a time, only one session is established between the stream server and the client. The one session is used to support whichever unicast stream is intended for real-time playout at the client.

Figure 4A:
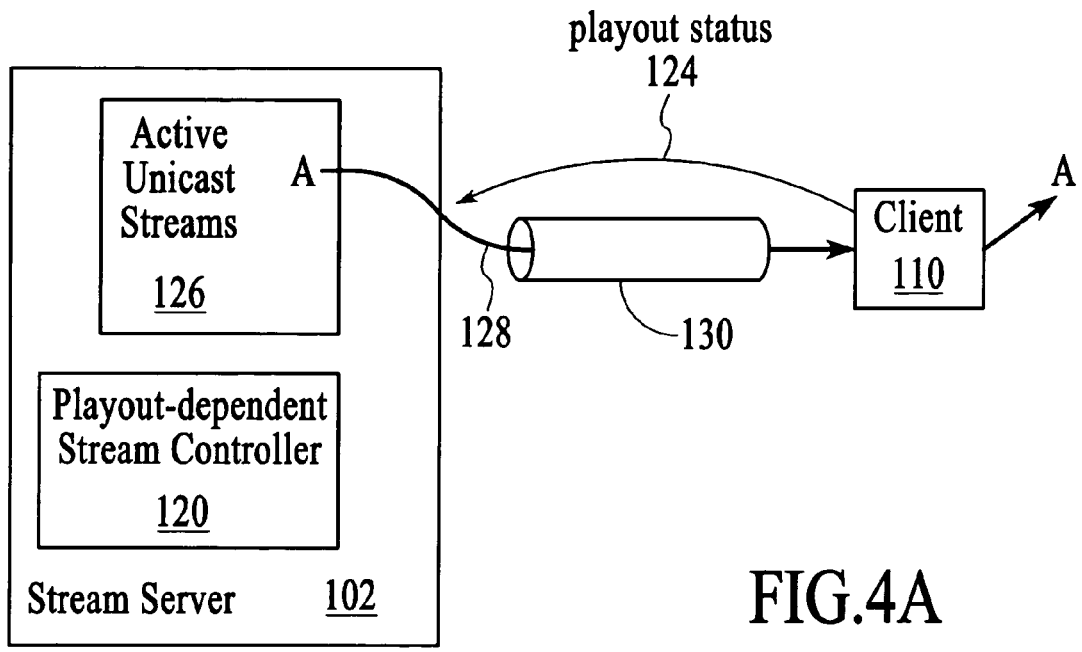
FIGS. 4A-4C illustrate the management of two unicast streams through a single session in accordance with an embodiment of the invention.

The management of two unicast streams through a single session is described with reference to FIGS. 4A-4C. FIG. 4A depicts a unicast stream 128 (unicast stream A) and a session 130 (e.g., session 1), which are active between a stream server 102 and a client 110. As illustrated in FIG. 4A, unicast stream A is the only active unicast stream between the stream server and the client. The playout status 124 of the client indicates that unicast stream A is intended for real-time playout and as a result, unicast stream A is provided to the client.

Figure 4B:
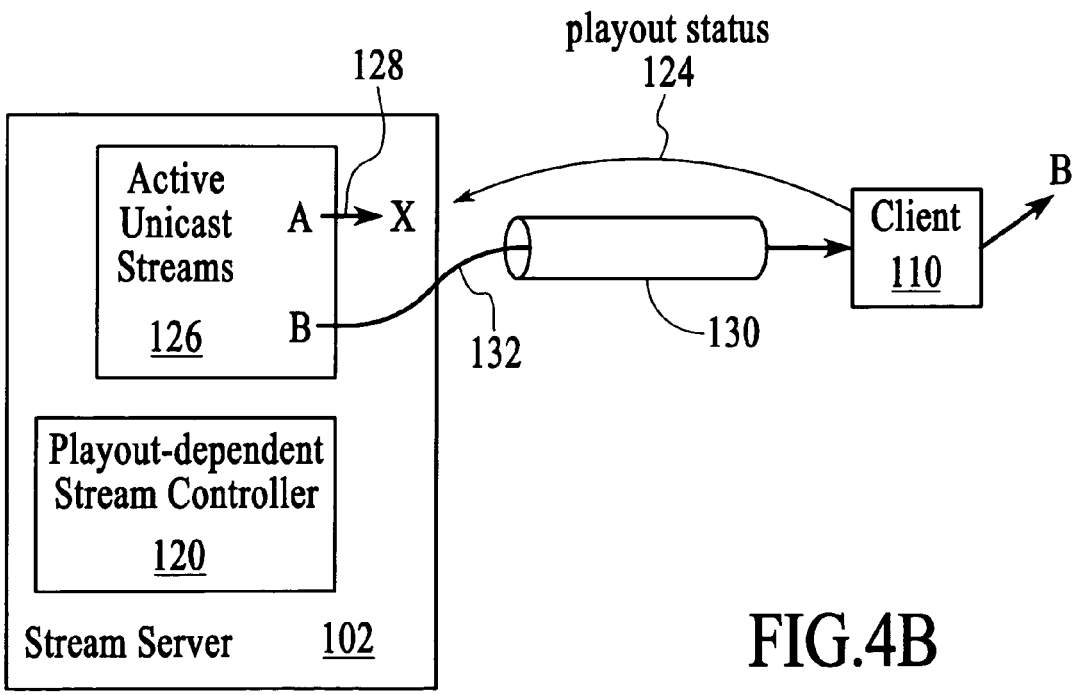

With reference to FIG. 4B, at some later point in time, the client 110 indicates that it desires to change the playout status 124. For example, the client indicates a desire to make a channel change by generating a channel change request that is provided to the stream server 102. The channel change request triggers the establishment of unicast stream B 132. Although another active unicast stream is established, in contrast to conventional techniques, the establishment of the second active unicast stream does not trigger the establishment of a corresponding session. Rather, the unicast stream that was previously being played out by the client (e.g., unicast stream A) is no longer provided to the client and the unicast stream that is intended for playout (e.g., unicast stream B) is provided to the client instead. Unicast stream B is provided to the client using the previously established session 130 instead of a session established just for unicast stream B. FIG. 4B depicts unicast stream B being provided to the client using the same session (e.g., session 1). Because only one session is established to service both of the active unicast streams, network resources associated with a second session are not consumed. Additionally, because the client is playing out only one unicast stream at a time, the client is not negatively impacted by the fact that there is only one session or by the fact that unicast stream A is no longer being provided to the client. The above-described technique avoids needlessly consuming resources associated with an active unicast stream that is not intended for real-time playout by the client.

Figure 4C:
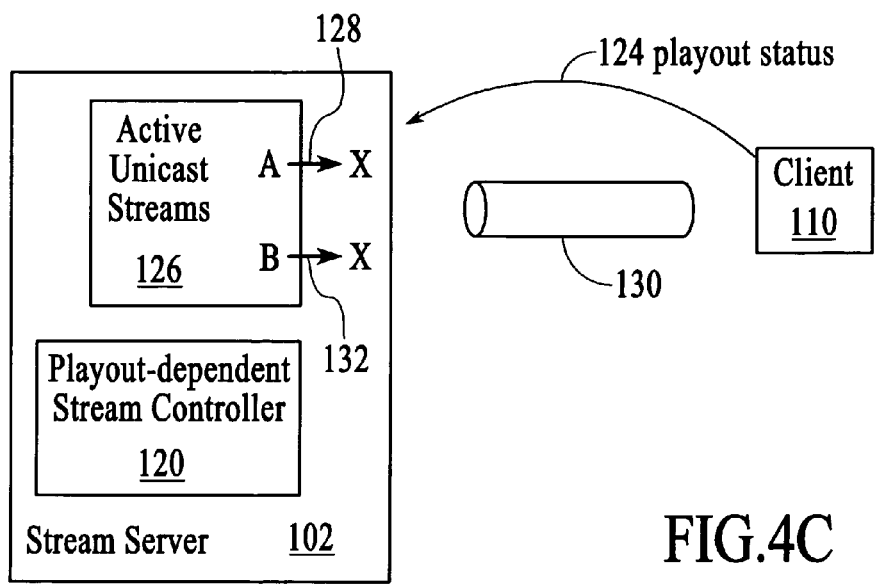

Referring to FIG. 4C, if the client 110 signals its intention to end playout of both unicast streams A and B, then neither unicast stream is provided to the client. Although neither unicast stream is provided to the client, because the unicast streams and the associated session 130 are still active, either one of the unicast streams could quickly be provided to the client using the session in response to a change in the playout status 124 at the client. In an embodiment, the playout-dependent stream controller 120 is configured to terminate the active unicast streams and the associated session once a pre-established condition is met. For example, the active unicast streams and the associated session can be terminated if they are not utilized for a pre-established time interval.

Figure 5:
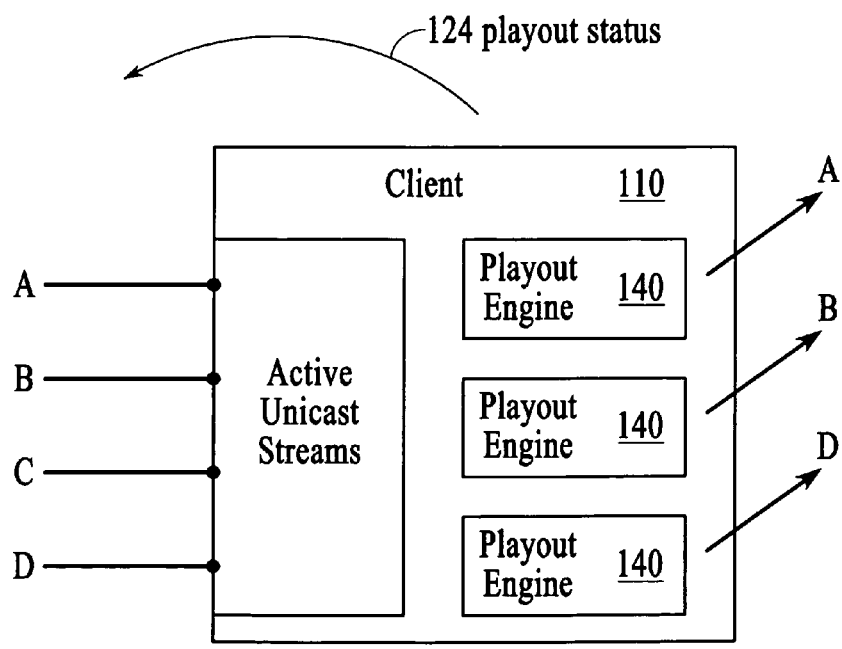
FIG. 5 depicts a client with four active unicast streams established between a stream server and the client and three unicast streams being played out in real-time at the client.

The playout-dependent unicast streaming technique as described above is applicable to a single active unicast stream and a client 110 that only plays out one stream at a time. The playout-dependent unicast streaming technique is especially applicable to instances in which the client is playing out fewer unicast streams than there are active unicast streams between the stream server and the client. FIG. 5 depicts a client 110 that includes three playout engines 140, where each playout engine is capable of playing out one unicast stream at a time. In the example of FIG. 5, the client has four active streams (e.g., unicast streams A, B, C, and D) established between a stream server (not shown) and the client with only three of the unicast streams (unicast streams A, B, and D) being played out in real-time from the playout engines. As described above, the unicast streams are provided to the client in response to the playout status 124 at the client. In an embodiment and in order to efficiently utilize network resources, unicast streams that are not intended for real-time playout are not provided to the client. In the example of FIG. 5, unicast stream C is active between the stream server (not shown) and the client, however, unicast stream C is not intended for real-time playout at the client. Because unicast stream C is not intended for real-time playout at the client, it is not provided to the client. Although FIG. 5 represents the case where the number of active unicast streams (m) is greater than the number of played out streams (n), the technique is also applicable to the case in which m is less than n and to the case in which m equals n.

Additional aspects of managing the streaming of digital video content in accordance with an embodiment of the invention are described below. These additional aspects include; 1) a description of playout-dependent logic for different channel change scenarios, 2) the handling of an active unicast stream that is not being provided to the respective client, 3) the termination of an active unicast stream, and 4) alternative session management techniques.

Playout-Dependent Logic for Different Channel Change Scenarios

In response to a client request for a unicast stream to be established between the client and a stream server, the stream server, working in concert with other streaming infrastructure elements, reserves the resources necessary to move the digital video content to the client. The set of stream server and edge network resources required to stream the digital video content to the client constitutes a session.

At some future point, the client requests that another unicast stream be established between the client and the stream server. The client requests the additional unicast stream without requesting the termination of any other unicast streams that are active between the client and the stream server. The stream server notes that the client is requesting an additional unicast stream. In response to the request for another unicast stream, the stream server allocates stream server resources and distribution network resources required to support the unicast stream, but does not reserve any additional edge network resources for the new unicast stream. Note that in this situation, there is already a session established between the stream server and the client over the edge network. This session is used to carry the new unicast stream to the client. In cases where the client is tuned to a channel not associated with any established unicast stream, the session can be idled.

In an embodiment, the response by a stream server to a channel change request depends on the transmission mode (e.g., either multicasting or unicasting) of the previous, current, and/or requested channels.

Scenario 1—Unicast stream-channel 1 (UC1) to unicast stream-channel 2 (UC2): If the channel to which the client is tuned before a channel change occurs is associated with a unicast stream (UC1) and the channel to which the client is tuned after the channel change occurs is associated with another unicast stream (UC2), the stream server stops streaming content from the first unicast stream (UC1) over the session and starts streaming content from the second unicast stream (UC2) over the same session.

Scenario 2—UC1 to multicast stream-channel 2 (MC2): If the channel to which the client is tuned before the channel change occurs is associated with a unicast stream (UC1) and the channel to which the client is tuned after the channel change occurs is not associated with a unicast stream (e.g., it is associated with real-time multicast content) (MC2), the stream server stops streaming content from the unicast stream (UC1) over the session and marks the session as idle.

Scenario 3—UC1 to MC2 to unicast stream-channel 3 (UC3): If the channel to which the client is tuned before the channel change occurs is not associated with a unicast stream (e.g., it is associated with real-time multicast content) (MC2) and the channel to which the client is tuned after the channel change occurs is associated with a unicast stream (UC3), then the stream server starts sending the content of the new unicast stream (UC3) over the session that was left idle after the initial switch from UC1 to MC2 (see scenario 2).

Scenario 4—UC1 to MC2 to multicast stream-channel 4 (MC4): If the channel to which the client is tuned before the channel change occurs is not associated with a unicast stream (e.g., it is associated with real-time multicast content) (MC2) and the channel to which the client is tuned after the channel change occurs is also not associated with a unicast stream (MC4), the stream server notes the channel change, but does not start streaming content over the idle session (the idle session is identified in scenario 2).

Handling of an Active Unicast Stream that is not Being Provided to the Respective Client An active unicast stream that is not being provided to the respective client can be handled in different ways. Two exemplary options are described below.

Option 1: One option is to cause the network to function as if the client executed a "Pause" command immediately prior to switching away from the channel associated with the unicast stream. This allows the stream server to idle distribution network and/or content source resources assigned to the unicast stream. When the client switches back to the channel associated with the unicast stream, the digital video content is provided to the client from the point at which it was when the client switched away.

Referring back to FIGS. 2, 4A, and 4B, in operation the stream server 102 receives playout status information 124 from the client 110 indicating that the client desires to playout a different channel. In response, the stream server activates a new unicast stream (e.g., unicast stream B) for the desired channel and provides the unicast stream to the client over the previously established session 130. The stream server also initiates the idling of the original unicast stream (e.g., unicast stream A). In an embodiment, the stream server communicates with the content source that is providing the content for unicast stream A and directs the content source to halt delivery of unicast stream A to the stream server.

Option 2: Another option is for the stream server to keep track of where the unicast stream would have been positioned if the client had not switched away from the unicast stream. When the client switches back to the channel associated with the unicast stream, the content play continues from the point at which it would have been had the client not switched away. Using this approach, the stream server keeps tracking the progression of the unicast stream but does not provide the unicast stream to the client. Because the stream server keeps tracking the progression of the unicast stream, the stream server is not able to idle the distribution network or content source resources allocated to the unicast stream. However, this approach provides the client with an experience that is much closer to that provided by conventional broadcast television. That is, when the client switches away from a broadcast channel, the content associated with the channel does not pause. Rather, the content continues progressing in time as if the client were still tuned to that channel.

Again referring back to FIGS. 2, 4A, and 4B, in operation the stream server 102 receives playout status information 124 from the client 110 indicating that the client desires to playout a different channel. In response, the stream server activates a new unicast stream (e.g., unicast stream B) for the desired channel and provides the unicast stream to the client over the previously established session 130. While unicast stream B is provided to the client, the stream server continues to receive the original unicast stream (e.g., unicast stream A) from the content source but doesn't provide the unicast stream to the client. The stream server also allows the original unicast stream to progress in time just as it would if it were being streamed to the client. If the client requests a switch back to unicast stream A, the stream server starts providing unicast stream A from its current time-progressed position. Using this approach, the client effectively loses the content related to the unicast stream that is not being played out. In an alternative embodiment, the stream server may idle the unicast stream for a pre-established time interval (e.g., up to 30 minutes) and then begin progressing the digital video content after the time interval expires. This would allow the client to return to the associated channel at, for example, up to 30 minutes behind the real-time content.

Termination of an Active Unicast Stream

In an embodiment, a session between a stream server and a client is not terminated as long as there is still an active unicast stream that could utilize the session. In an exemplary operation, when an active unicast stream is terminated, the stream server on which the unicast stream was active first determines whether there are other unicast streams active for the client (i.e., streams established between the stream server and client and not yet terminated). If there are no other active unicast streams associated with the client, the stream server terminates the unicast stream and terminates the corresponding session by freeing the allocated network resources. If there are other active unicast streams associated with the client, the stream server terminates the unicast stream but does not terminate the session.

Alternative Session Management Techniques

The technique for managing the streaming of digital video content may also incorporate the following optional session management strategies, alone or in any combination.

1. A typical client plays out only one stream at a time. However, there are cases in which a client plays out more than one stream at a time. For example, when a client supports Picture-in-Picture (PIP) functionality, the stream server may send two or more unicast streams to the client. Another example occurs when a stream server sends one unicast stream to a client for real-time playout and another unicast stream to the client for playout to a Digital Video Recorder (DVR). In both cases, the client is equipped with more than one playout engine (e.g., one tuner for each simultaneous stream it can handle). Whatever the reason for sending more than one unicast stream to a client, each playout engine at the client is treated individually as described above. That is, playout-dependent streaming as described above is applied on a playout engine-by-playout engine (e.g., tuner-by-tuner) basis.

2. When session resources are left idle (e.g., when the client switches away from content that is provided via unicasting), the idle resources assigned to the session are wasted. To more efficiently utilize network resources, an idle session can be terminated once a pre-established condition is met. For example, an idle session can be terminated after a pre-established time interval has expired. That is, if a session remains idle longer than the pre-established time interval, the stream server terminates the session. If the client subsequently switches to a channel associated with a unicast stream, the stream server establishes a new session to carry the unicast stream. Other pre-established conditions that could trigger the termination of a session may include expiration of a pre-established time interval in which no channel change requests are received, an explicit request to terminate a session, reaching a pre-established resource threshold (e.g., terminate a session when network resources drop below a minimum value), or reaching a benefit threshold (e.g., terminate the session only if a certain benefit is achieved or only if certain resources can be reclaimed).

Figure 6A:
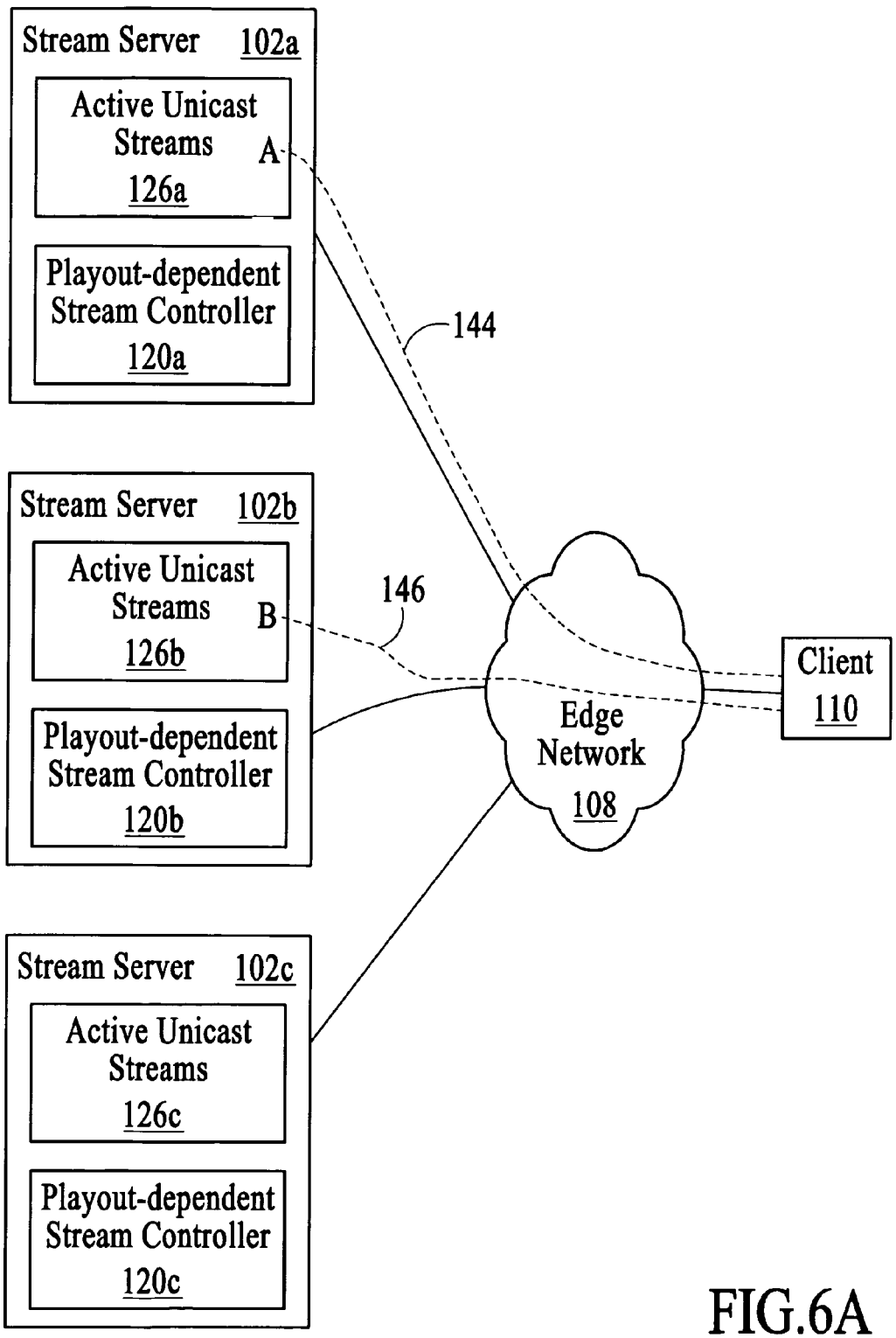
FIG. 6A illustrates a case in which two different stream servers support an active unicast stream for the same client.
Figure 6B:
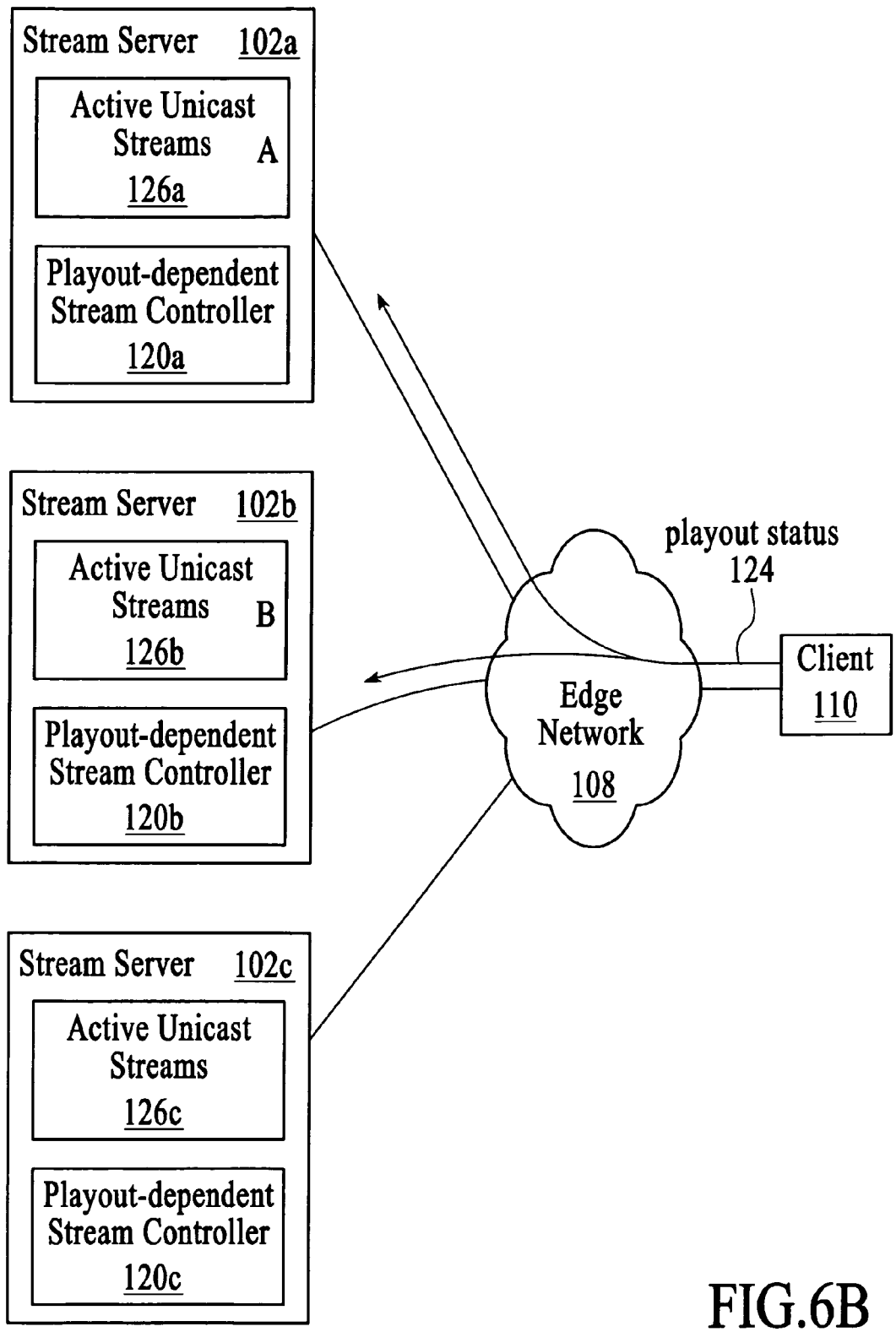
FIG. 6B illustrates playout information being communicated from a client to each stream server that supports an active unicast stream for the client.
Figure 6C:
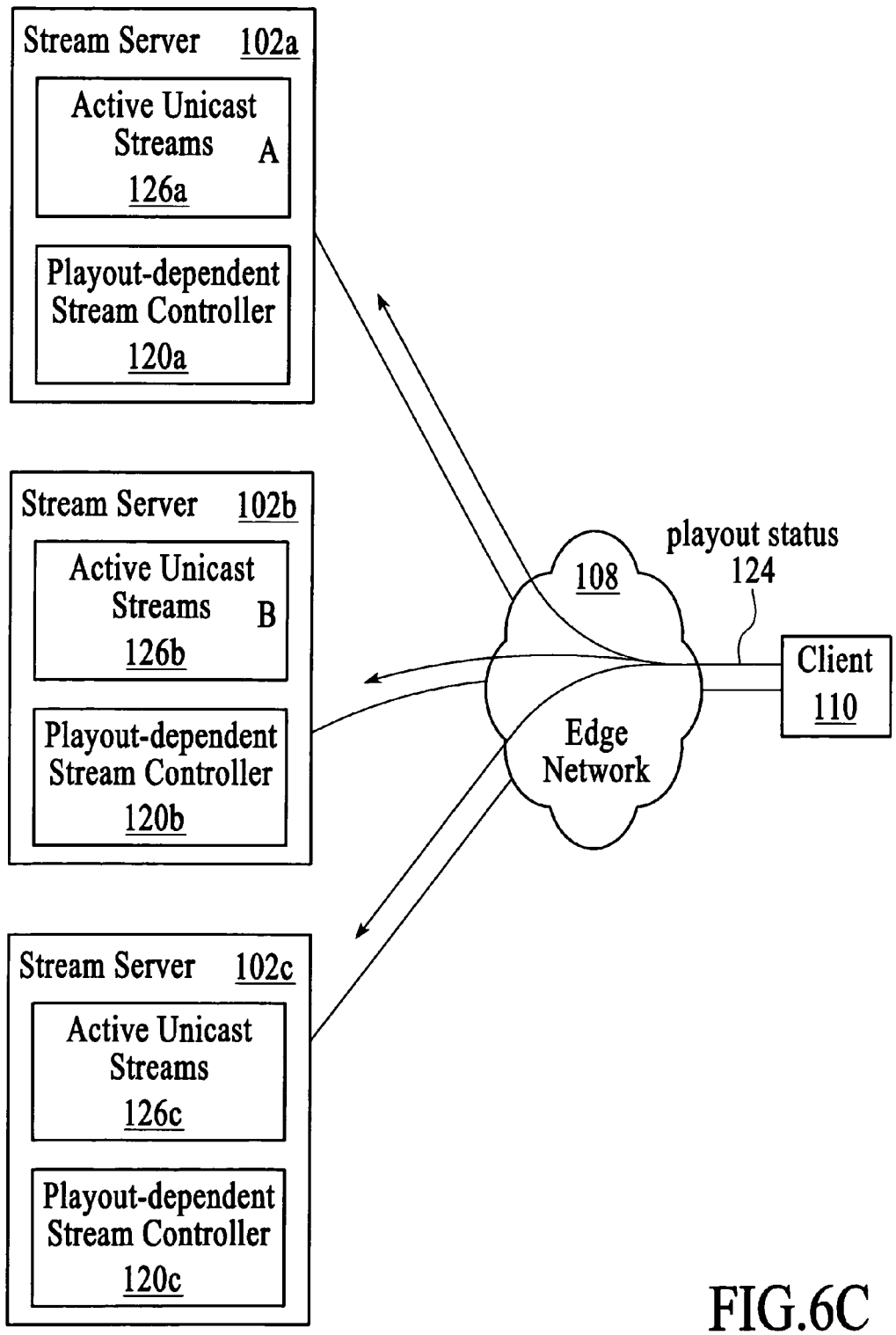
FIG. 6C illustrates playout information being communicated from the client to each stream server that might support an active unicast stream for the client.

3. Multiple Stream Servers: When multiple unicast streams are established for a particular client, it is possible that some of the unicast streams are provided by different stream servers in the network. FIG. 6A illustrates a case in which two different stream servers 102a and 102b support an active unicast stream for the same client. In particular, unicast stream A (represented by dashed line 144) is serviced by stream server 102a and unicast stream B (represented by dashed line 146) is serviced by stream server 102b. In an embodiment, the group of stream servers that support the active unicast streams coordinate their actions in order to prevent a session from being prematurely terminated. For example, channel change notification protocol messages from a client are multicast to all stream servers with active unicast streams associated with the client. FIG. 6B illustrates playout status information 124 being communicated from the client to the stream servers 102a and 102b that support active unicast streams. Alternatively, the client can multicast channel change notification protocol messages to each stream server that might stream content to it. FIG. 6C illustrates playout status information 124 being communicated from the client to each stream server 102a, 102b, and 102c that might support an active unicast stream for the client. By communicating playout status information to all stream servers that might stream content to the client, the included stream servers remain cognizant of the channel to which the client is tuned.

In an embodiment, each stream server that receives a channel change notification protocol message from a client acts as if it were the only stream server servicing the client in regards to whether it places or removes unicast content destined for the client on/from the client session. If the client switches away from a channel associated with a unicast stream that a particular stream server is sourcing, then the stream server stops sending content for that stream over the session. If the client switches to a channel associated with a unicast stream that a particular stream server is sourcing, then the stream server resumes sending content from that unicast stream over the session.

In an embodiment, all stream servers that can source unicast streams to a client must coordinate their actions in regards to session management. For example, before a stream server establishes a new session between the stream server and a client, the stream servers check to see if a session is already established to the client from the set of stream servers that can provide unicast streams to the client. If a session already exists, the stream servers refrain from establishing another session (unless it is for a second playout engine, as described above). Stream servers also check to see if other stream servers are providing streams to the client before destroying a session to the client. If other stream servers have active streams to the client, even if they are not currently using session resources, a stream server will not terminate the session. In order to terminate a session due to, for example, the session being idle for a pre-established time interval, all stream servers in the group that can source streams to the client must agree to do so.

Figure 7:
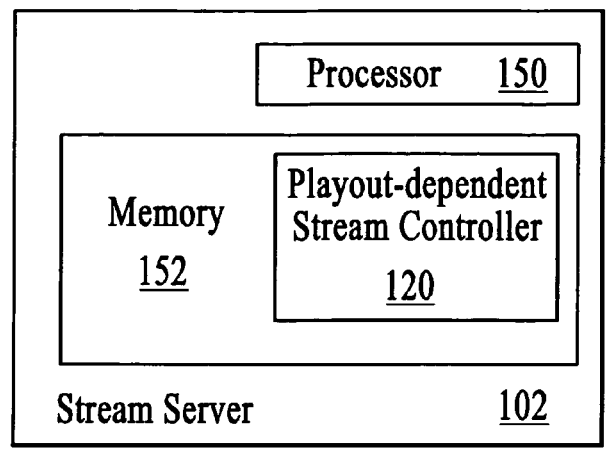
FIG. 7 depicts an embodiment of a stream server that is configured to implement playout-dependent unicast streaming as described above.

FIG. 7 depicts an embodiment of a stream server 102 that is configured to implement playout-dependent unicast streaming as described above. The stream server includes a processor 150 and memory 152. The processor within the stream server may include a multifunction processor and/or an application specific processor that is operationally connected to the memory. The processor performs functions, such as executing software code, which are well-known in the field. The memory within the stream server may include circuits for storing processor-executable instructions, for buffering digital video content, and for storing data structures. Although the processor and memory are depicted as separate functional units, in some instances, the processor and memory are partially or fully integrated onto the same device. In the embodiment of FIG. 7, the playout-dependent stream controller 120 is embodied as processor-executable instructions that are stored in the stream server's memory. Processor-executable instructions generally include programs, protocols, data structures, routines, objects, and interfaces that can perform and/or enable certain useful functions. Although the above-identified playout-dependent stream controller is depicted as a single functional block in FIGS. 1-4, 6, and 7, the playout-dependent stream controller can be distributed within a server or among multiple servers, and/or clients. Likewise, although the stream server is depicted as a single entity for description purposes, the stream server may be implemented as a single server or multiple servers that act collectively to stream digital video content to the clients.

Figure 8:
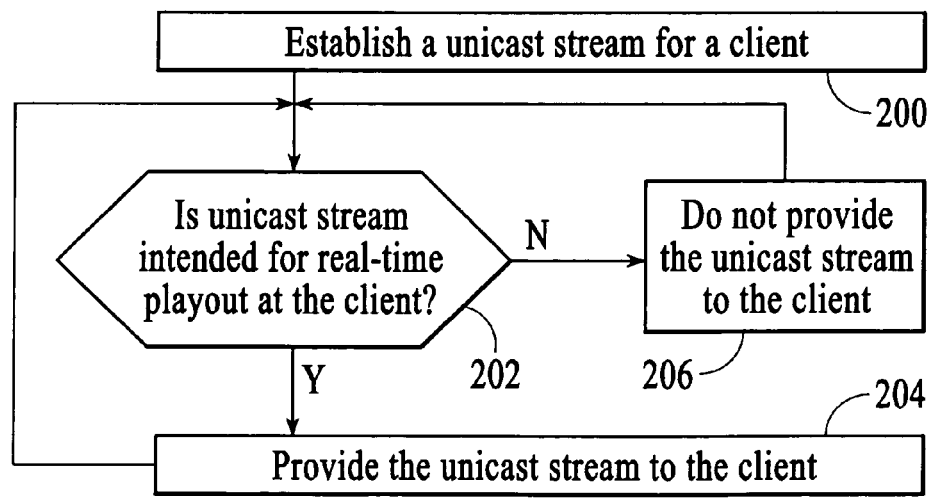
FIG. 8 is a logic flow diagram of playout-dependent unicast streaming in accordance with an embodiment of the invention.

FIG. 8 is a logic flow diagram of playout-dependent unicast streaming in accordance with an embodiment of the invention. At block 200, a unicast stream is established for a client. At decision point 202, it is determined whether the unicast stream is intended for real-time playout at the client. If the unicast stream is intended for real-time playout at the client, then the unicast stream is provided to the client (block 204). If the unicast is not intended for real-time playout at the client then the unicast stream is not provided to the client (block 206). The processes of evaluating the playout status repeats as indicated by the return to decision point 202.

Figure 9:
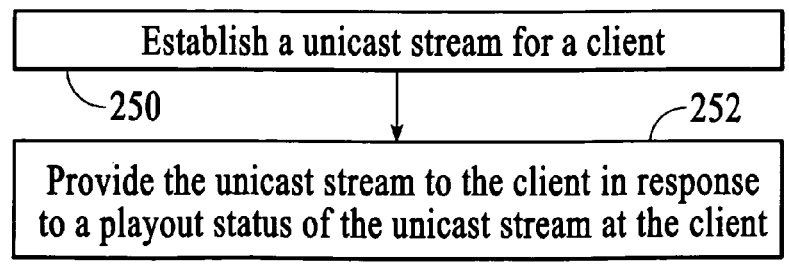
FIG. 9 is a process flow diagram of a method for managing the streaming of digital video content in accordance with an embodiment of the invention.

FIG. 9 is a process flow diagram of a method for managing the streaming of digital video content in accordance with an embodiment of the invention. At block 250, a unicast stream is established for a client. At block 252, the unicast stream is provided to the client in response to a playout status of the unicast stream at the client.

A "stream" of digital video content can be a real-time multimedia stream such as MPEG2 encoded video and audio. As is known in the field, a stream of digital video content has tight timing constraints related to the timing of the delivery of stream contents to the client (i.e., playout device).

As used herein, an active unicast stream includes a unicast stream for which digital content is continually be provided into the video on demand network. For example, active unicast streams are typically associated with real-time digital video content that is being continuously ingested at the video source as opposed to a static block of content that is stored locally within the video on demand network.

Digital media content includes digital video content. Digital media content could also include other forms of digital media content including, for example, video and audio, audio only, three-dimensional holography, aroma information, and tactile sensation information.

In one embodiment, only a fixed number of unicast streams and a fixed number of sessions can be provisioned or communicated between the client and the stream server. All subsequent operations are invoked relative to those unicast streams and sessions.

Although specific embodiments of the invention have been described and illustrated, the invention is not to be limited to the specific forms or arrangements of parts as described and illustrated herein. The invention is limited only by the claims.

What is claimed is:

1. A method for managing the streaming of digital media content in a network that streams digital media content to clients via multicasting and unicasting, the method comprising:
    establishing a real time streaming protocol (RTSP) session to secure resources necessary to provide a unicast stream to a client from a stream server;
    streaming content from a first channel to the client from the stream server, which provides digital video content simultaneously to multiple different clients, via the unicast stream, the unicast stream being referred to as the original unicast stream;
    receiving a channel change request at the stream server from the client indicating that the client desires to playout a different channel;
    in response to the channel change request received at the stream server from the client, idling the original unicast stream at the point at which the channel change request was received;
    activating a new unicast stream for the different channel and providing the new unicast stream to the client from the stream server instead of the original unicast stream;
    receiving a subsequent channel change request at the stream server from the client indicating that the client deserves to switch back to the first channel; and
    switching to streaming content from the first channel to the client from the stream server via the original unicast stream from the point at which the original unicast stream was idled;
    wherein the original unicast stream and the new unicast stream are streamed to the client using the same RTSP session,
    wherein the original unicast stream is idled for a pre-established time interval and then progressed in time after the pre-established time interval expires, the original unicast being progressed in time comprises the stream server tracking progression of the original unicast stream to allow the client to return to the idled original unicast stream from a delayed time-progressed position.

2. The method of claim 1 wherein the idling of the original unicast stream is initiated by the stream server in response to the channel change request.

3. The method of claim 2 wherein the idling comprises the stream server communicating with a source of the content and directing the content source to halt delivery of the original unicast stream to the stream server.

4. The method of claim 1 wherein the channel change request received from the client at the stream server causes the network to function as if the client executed a pause command immediately prior to switching away from the first channel.

5. A method for managing the streaming of digital media content in a network that streams digital media content to clients via multicasting and unicasting, the method comprising:
    establishing a real time streaming protocol (RTSP) session to secure resources necessary to provide a unicast stream to a client;
    streaming content from a first channel from a stream server, which provides digital video content simultaneously to multiple different clients, to the client via a unicast stream using the RTSP session, the unicast stream being referred to as the original unicast stream;
    receiving a channel change request at the stream server from the client indicating that the client desires to playout a different channel;
    in response to the channel change request received at the stream server from the client, idling the original unicast stream at the point at which the channel change request was received, wherein the original unicast stream is idled for a pre-established time interval and then progressed in time after the pre-established time interval expires, the original unicast being progressed in time comprises the stream server tracking progression of the original unicast stream to allow the client to return to the idled original unicast stream from a delayed time-progressed position;
    activating a new unicast stream for the different channel and providing the new unicast stream to the client from the stream server instead of the original unicast stream, wherein the new unicast stream is provided using the same RTSP session;
    receiving a subsequent channel change request at the stream server from the client indicating that the client desires to switch back to the first channel; and
    switching to streaming content from the first channel to the client from the stream server via the original unicast stream from the point at which the original unicast stream was idled, wherein the original unicast stream is streamed using the same RTSP session.

6. A system for managing the streaming digital media content in a network that is configured to stream digital media content to clients via multicasting and unicasting, the system comprising:
    a stream server configured to:
        stream digital video content simultaneously to multiple different clients;
        establish a real time streaming protocol (RTSP) session to secure resources necessary to provide a unicast stream to the client;
        stream content from a first channel to a client of the multiple different client via a the unicast stream, the unicast stream being referred to as the original unicast stream;
        receive a channel change request from the client indicating that the client desires to playout a different channel;
        in response to the channel change request received from the client, idle the original uncast stream at the point at which the channel change request was received, wherein the original unicast stream is idled for a pre-established time interval and then progressed in time after the pre-established time interval expires, the original unicast being progressed in time comprises the stream server tracking progression of the original unicast stream to allow the client to return to the idled original unicast stream from a delayed time-progressed position;
        activate a new unicast stream for the different channel and provide the new unicast stream to the client instead of the original unicast stream;
        receive a subsequent channel change request from the client indicating that the client desires to switch back to the first channel;
        switch to streaming content from the first channel to the client via the original unicast stream from the point at which the original unicast stream was idled; and wherein the original unicast stream and the new unicast stream are streamed to the client using the same RTSP session.

7. The system of claim 6 wherein the stream server initiates the idling of the original unicast stream in response to the channel change request.

8. The system of claim 6 wherein the stream server is further configured to communicate with a source of the content and to direct the content source to halt delivery of the original unicast stream to the stream server during the idling.

9. The system of the claim 6 wherein the channel change request from the client causes the network to function as if the client executed a pause command immediately prior to switching away from the first channel.

10. The method of claim 1, wherein establishing the RTSP session comprises reserving network resources during a setup process, the network resources being only available to the client and no other clients.

* * * * *